United States Patent [19]
Yagoto et al.

[11] Patent Number: 6,064,128
[45] Date of Patent: May 16, 2000

[54] LINEAR MOTOR AND IMAGE READER

[75] Inventors: Mitsutoshi Yagoto, Toyokawa;
Katsuhiro Nanba, Okazaki;
Masamitsu Ishiyama, Toyokawa, all of Japan

[73] Assignee: Minolta Co., Ltd., Osaka, Japan

[21] Appl. No.: 09/152,542

[22] Filed: Sep. 14, 1998

[30] Foreign Application Priority Data

Sep. 17, 1997 [JP] Japan ................................. 9-252480
Aug. 6, 1998 [JP] Japan ................................. 10-223442

[51] Int. Cl.$^7$ .................................................. H02K 41/00
[52] U.S. Cl. ............................................................. 310/12
[58] Field of Search .................................. 310/12, 13, 14

[56] References Cited

U.S. PATENT DOCUMENTS

| | | | |
|---|---|---|---|
| 4,837,467 | 6/1989 | Newman | 310/12 |
| 5,081,381 | 1/1992 | Narasaki | 310/12 |
| 5,675,195 | 10/1997 | Takei | 310/12 |

FOREIGN PATENT DOCUMENTS

| | | |
|---|---|---|
| 59-006764 | 1/1984 | Japan . |
| 2-065458 | 3/1990 | Japan . |
| 7-181601 | 7/1995 | Japan . |
| 08098501 | 4/1996 | Japan . |

*Primary Examiner*—Nestor Ramirez
*Assistant Examiner*—Judson H. Jones
*Attorney, Agent, or Firm*—Sidley & Austin

[57] ABSTRACT

A linear motor provided with a stator extending in a predetermined direction and a movable piece being movable along the stator, comprises:

a field magnet arranged at the stator;

an armature coil arranged at the movable piece and opposed to the field magnet; and a drive circuit for energizing the armature coil and thereby driving the movable piece, the drive circuit being formed at an electric circuit-board arranged on the movable piece.

An image reader for optically scanning and reading an original image, comprises:

a slider carrying an illumination light source for emitting light to the original image and being driven linearly in a predetermined direction;

a stator provided with a field magnet having N- and S-type magnetic poles arranged alternately and linearly in the predetermined direction;

a movable piece having an armature coil opposed to the field magnet, being movable along the stator, and coupled to the slider; and a drive circuit for energizing the armature coil and thereby driving the movable piece, the drive circuit being formed at an electric circuit-board arranged on the movable piece.

19 Claims, 12 Drawing Sheets

LINEAR MOTOR AND IMAGE READER

This application is based on application Nos. 9-252480 Pat. and 10-223442 Pat. both filed in Japan, the contents of which are hereby incorporated by reference.

BACKGROUND OF THE INVENTION

1. Field of the Invention

The present invention relates to a linear motor of a moving coil type provided with a stator having a field magnet as well as a movable piece which has an armature coil opposed to the field magnet and is movable along the stator. Also, the present invention relates to an image reader using a linear motor of a moving coil type for optically scanning and reading an original image and, more specifically, for linearly driving a slider which carries optical parts including an illumination lamp.

2. Description of the Background Art

Linear motors have been utilized for linearly moving objects in a wide field including office automation equipments such as copying machines, printers and image scanners, factory automation equipments such as X-Y tables and object transporting devices, and optical equipments such as cameras.

In one of known types of linear motors, a stator is provided with a field magnet having N-type magnetic poles and S-type magnetic poles, which are arranged alternately and linearly in a predetermined direction, and a movable piece, which is movable along the stator, is provided with an armature coil opposed to the field magnet. This type of linear motor is called a moving coil type.

In the linear motor of the moving coil type, the armature coil of the movable piece is energized under control to move the movable piece along the stator. This energizing of (i.e., power supply to) the armature coil of the movable piece as well as the control of energizing are performed based on information sent from various sensors which are arranged on the movable piece as will be described later. For these energizing and control, a harness (i.e., a bundle of electric cables) is extended from the movable piece to connect a power supply circuit for the armature coil with the armature coil and the various sensors on the movable piece.

The sensor for controlling the power supply to the armature coil is provided, e.g., for the field magnet, and more specifically is provided, e.g., for detecting a polarity of magnetic pole of the field magnet to which the moving armature coil opposes and/or for detecting an intensity of the magnetic field formed by the field magnet. As this sensor for the field magnet, a magnetoelectric conversion element such as a Hall element or a magnetic resistance element (MR element) is usually employed. The magnetoelectric conversion element can issue an electric signal corresponding to the polarity of the magnetic pole and the intensity of the magnetic field.

In addition to the above, a sensor for an encoder is employed as the sensor which is arranged on the movable piece for controlling the power supply to the armature coil. The encoder is formed of the encoder sensor (i.e., sensor for the encoder) arranged on the movable piece and an encoder scale which is arranged at a stationary position and extends in the lengthwise direction of the stator. The encoder may be of either an optical type or a magnetic type as is well known.

The encoder scale for the optical encoder is provided with two kinds of surfaces which have optically different properties and are arranged alternately in the lengthwise direction of the stator. For example, an encoder of a so-called reflection type is completed by employing two kinds of (e.g., white and black) surfaces which have different reflectances to each other and are arranged alternately in the lengthwise direction of the stator. An encoder of a so-called transparent type is completed by employing two kinds of surfaces which have different light transmittances to each other and are arranged alternately in the lengthwise direction of the stator. In either case, the sensor for the optical encoder includes a photoelectric conversion element such as a photodiode or a phototransistor, which can issue electric signal corresponding to quantity of light. In some cases, the sensor for the optical encoder may be a photosensor (an optical sensor) which is one packaged combination of a light emitting element such as a light emitting diode (LED), which emits light toward the encoder scale, and a photoelectric conversion element.

In the magnetic encoder, the encoder scale is provided with N- and S-type magnetic poles arranged alternately in the lengthwise direction of the stator. The sensor for the magnetic encoder usually may be a magnetoelectric conversion element such as a magnetic resistance element (MR element) or a Hall element which issues an electric signal corresponding to the polarity of the magnetic pole of the magnetic encoder scale and/or the intensity of the magnetic field.

A power supply and drive circuit for supplying a current to the armature coil and thereby driving the movable piece along the stator usually operates to supply the current to the armature coil based on a field magnet signal sent from the foregoing sensor for the field magnet and/or an encoder signal sent from the encoder sensor. For achieving a compact structure of the circuit, the power supply and drive circuit sometimes employs a motor drive IC. The power supply and drive circuit is arranged at a fixed position outside the movable piece.

The linear motor of such a moving coil type may be used in the image reader such as an image scanner for optically scanning and reading an original image. In the image reader, a slider carrying optical parts such as an illumination lamp is linearly moved for optically scanning the original image, and the linear motor is used for driving the slider. A fluorescent lamp is used as the illumination lamp in many cases, and a turn-on circuit for the illumination lamp is arranged at a fixed position outside the movable piece.

However, when the harness extended from the movable piece has many cables for energizing the armature coil on the movable piece, for transmitting the output signals from the sensors for the field magnet, for transmitting the output signals from the sensors for the encoder and others, it is difficult to handle and rout the harness having such many cables. The armature coil is usually formed of two or more coils. For example, when three-phase energizing is performed, the armature coil is formed of one or more coil group(s) each including three coils. In any of the structures, as the coils forming the armature coil increases in number, the cables extended from the movable piece increase in number so that smooth movement of the movable piece may be impeded, and/or routing of the harness may be difficult. When the harness is bent excessively, and thereby the harness is broken, the movable piece cannot be driven.

As described above, the magnetoelectric conversion element for the field element, photoelectric conversion element for the encoder and/or the magnetoelectric conversion element for the encoder may be arranged on the movable piece for controlling the power supply to the armature coil. In this case, each of electric signals issued from these elements are usually extremely weak analog signal so that the signal is liable to be affected by noises during transmission through the harness extended from the movable piece. If the signals issued from these elements are affected by noises, the control of energizing the armature coil cannot be performed precisely, and therefore the movable piece cannot be driven precisely.

Noise sources of such noises are, for example, as follows. The harness extended from the movable piece includes a cable for energizing the armature coil. This cable for energizing the armature coil transmits a current larger than signals or the like issued from the foregoing sensing elements, and is routed in parallel with the cables for transmitting signals issued from the foregoing elements in many cases. Therefore, the cable for energizing the armature coil forms the noise source.

In the image reader for optically scanning and reading an original image, the linear motor can be used for linearly moving the slider carrying optical parts, as described above. If the image reader is provided with a liquid crystal display for displaying various information, a display circuit of the liquid crystal display may form the noise source.

In the case where the linear motor is used, in the image reader, for driving the slider carrying optical parts including the illumination lamp such as a fluorescent lamp as described above, a cable for an illumination lamp turn-on circuit arranged at a fixed position outside the movable piece is likewise extended from the movable piece or a slider portion near the same. This cable further increases the number of cables of the harnesses extended from the movable piece or a portion near the same, which further makes the routing of the harness difficult. In the above image reader, if the movable piece is not driven precisely due to an influence by noises as described above, good image reading cannot be performed.

SUMMARY OF THE INVENTION

Accordingly, it is an object of the invention to provide a linear motor of a moving coil type which is provided with a stator having a field magnet and extending in a predetermined direction, and a movable piece having an armature coil opposed to the field magnet and being movable along the stator, and more specifically, the followings are objects of the invention.

One of the objects of the invention is to provide a linear motor which can reduce the number of cables of a harness extended from the movable piece so that the harness can be routed easily.

Another object of the invention is to provide a linear motor, in which a sensor for the field magnet is arranged on the movable piece for controlling power supply to the armature coil, and an influence exerted by noises on an output electric signal of this sensor can be suppressed so that the movable piece can be driven precisely.

Still another object of the invention is to provide a linear motor, in which a sensor for an encoder is arranged on the movable piece for controlling power supply to the armature coil, and an influence exerted by noises on an output electric signal of this sensor can be suppressed so that the movable piece can be driven precisely.

Also, it is an object of the invention to provide an image reader, which uses the linear motor of the moving coil type for optically scanning and reading an original image and, more specifically, for linearly driving a slider carrying optical parts such as an illumination lamp. Particularly, the followings are objects of the invention.

A further object of the invention is to provide an image reader which can reduce the number of cables of a harness extended from the movable piece so that the harness can be routed easily.

Further another object of the invention is to provide an image reader, in which a sensor for the field magnet is arranged on the movable piece for controlling power supply to the armature coil, and an influence exerted by noises on an output electric signal of this sensor can be suppressed so that the movable piece can be driven precisely, and thereby, good image reading can be performed.

Still further another object of the invention is to provide an image reader, in which a sensor for an encoder is arranged on the movable piece for controlling power supply to the armature coil, and an influence exerted by noises on an output electric signal of this sensor can be suppressed so that the movable piece can be driven precisely, and thereby, good image reading can be performed.

The invention provides a linear motor provided with a stator extending in a predetermined direction and a movable piece being movable along the stator, and comprising:

a field magnet arranged at the stator;

an armature coil arranged at the movable piece and opposed to the field magnet; and a drive circuit for energizing the armature coil and thereby driving the movable piece, wherein the drive circuit is formed at an electric circuit-board arranged on the movable piece.

Also, the invention provides an image reader for optically scanning and reading an original image, comprising:

a slider carrying an illumination light source for emitting light to the original image and being driven linearly in a predetermined direction;

a stator provided with a field magnet having N- and S-type magnetic poles arranged alternately in the predetermined direction;

a movable piece having an armature coil opposed to the field magnet, being movable along the stator, and coupled to the slider; and a drive circuit for energizing the armature coil and thereby driving the movable piece, wherein the drive circuit is formed at an electric circuit-board arranged on the movable piece.

The foregoing and other objects, features, aspects and advantages of the present invention will become more apparent from the following detailed description when taken in conjunction with the accompanying drawings.

Figure 1:
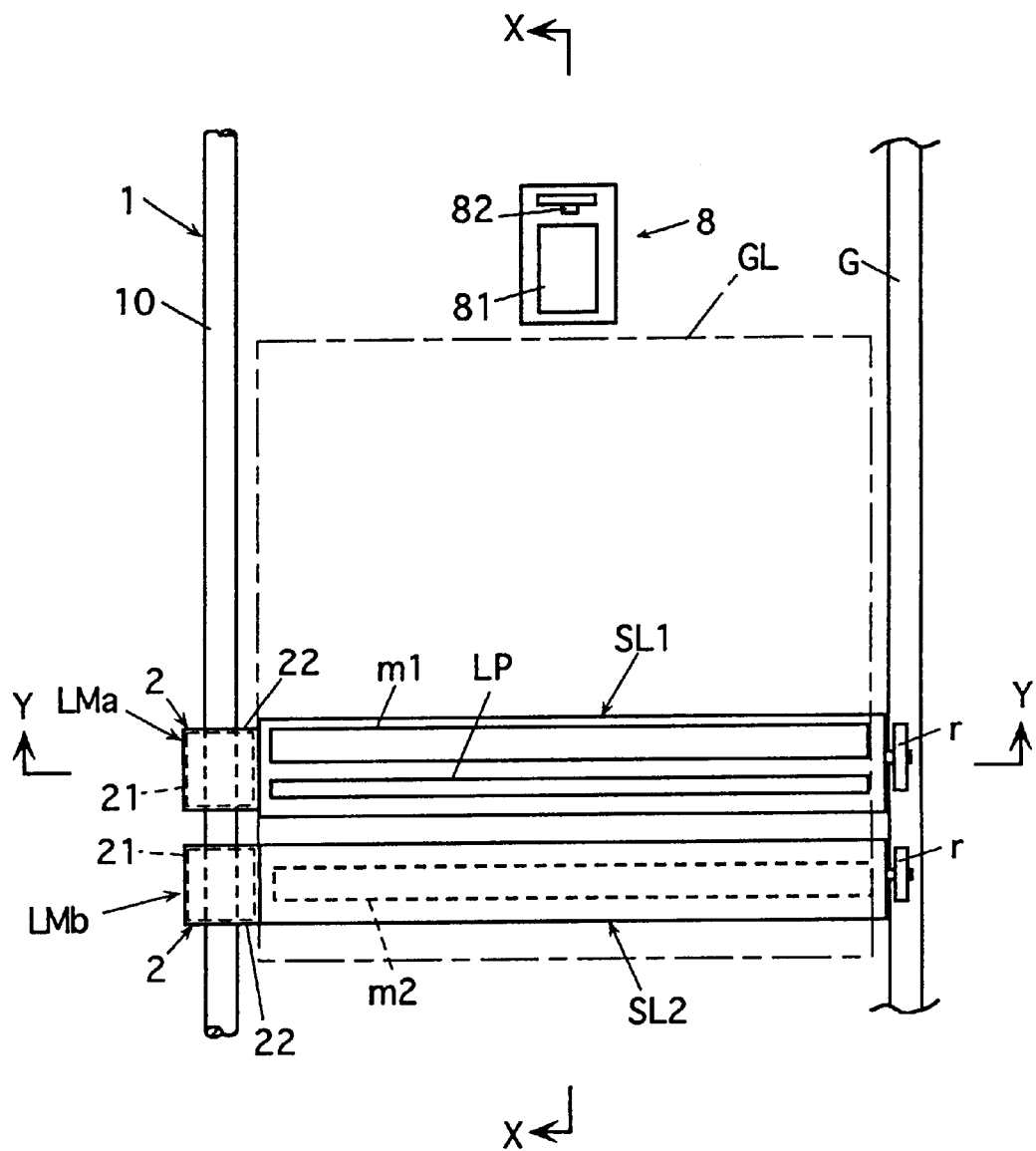
FIG. 1 is a schematic plan showing an example of an image reader according to the invention.

DESCRIPTION OF THE PREFERRED EMBODIMENTS (1-1) Linear Motor

A linear motor of an embodiment of the invention is provided with a stator extending in a predetermined direction and a movable piece being movable along the stator, and comprises:

a field magnet arranged at the stator;

an armature coil arranged at the movable piece and opposed to the field magnet; and a drive circuit for energizing the armature coil and thereby driving the movable piece, wherein the drive circuit is formed at an electric circuit-board arranged on the movable piece.

This linear motor is of a so-called moving coil type, in which the field magnet forms the stator, and the armature coil forms the movable piece. The field magnet is provided with N- and S-type magnetic poles arranged alternately and linearly in a predetermined direction.

An example of the linear motor of the moving coil type may be of a shaft type, in which the stator has a shaft-like form extending in the predetermined direction and has the field magnet provided with N- and S-type magnetic poles arranged linearly and alternately in the predetermined direction, and the movable piece has an armature coil fitted around the field magnet and is movable along the stator. Another example of the moving coil type may be of a plain-type or plate type, in which the stator has a field magnet provided with plate-like N-type magnetic poles and plate-like S-type magnetic poles arranged alternately and linearly in the predetermined direction, and the movable piece has an annular armature coil having an opening opposed to the field magnet, and is movable along the stator.

When the armature coil is energized, the armature coil is subjected to an electromagnetic force produced by an interaction between a current flowing through the armature coil and a magnetic field formed by the field magnet so that the movable piece can be driven in the lengthwise direction of the stator.

The energizing of the armature coil is performed by the drive circuit which is formed at the electric circuit-board arranged on the movable piece. The drive circuit may include a motor drive IC. The drive circuit may not include a circuit for instructing start and stop of driving of the motor.

Owing to formation of the drive circuit on the electric circuit-board on the movable piece, a connection between the armature coil and the drive circuit can be formed on the movable piece. Therefore, it is not necessary to employ a conventional structure in which a cable for connecting the armature coil and the drive circuit is included in a harness extended from the movable piece. Accordingly, cables in the harness extended from the movable piece can be reduced in number.

If the armature coil is formed of two or more single-coils, which are to be connected to achieve a predetermined connection, each coil may be electrically connected to the electric circuit-board carrying the drive circuit so that the predetermined connection may be achieved by an interconnection pattern arranged on the electric circuit-board.

The predetermined connection may be, for example, such that the respective coils are star-connected if the armature coil is formed of one or more coil groups each including three coils. If the plurality of coil groups each including three coils are star-connected, parallel connection may be employed for the start connection.

The respective coils may be electrically connected to the electric circuit-board provided with a connection pattern for achieving the predetermined connection, and thereby the respective coils are connected in the predetermined connection.

When the predetermined connection is achieved by the interconnection pattern formed on the electric circuit board, the predetermined connection can be achieved more easily than the case where the respective coils are connected in the predetermined connection by soldering or the like without employing the electric circuit-board. Further, it is possible to suppress an error and a failure in connection of the respective coils.

When the drive circuit energizes the armature coil based on, e.g., the polarity of the magnetic pole of the field magnet to which the armature coil opposes, the linear motor may be further provided with a magnetoelectric conversion element for the field magnet arranged at a position, on the movable piece, opposed to the field magnet, and a field magnet signal processing circuit for digitizing an electric signal issued from the magnetoelectric conversion element for the field magnet. In this case, the field magnet signal processing circuit may be formed at the electric circuit-board carrying the drive circuit.

The magnetoelectric conversion element for the field magnet may be arranged to achieve a predetermined positional relationship in the lengthwise direction of the stator with respect to the armature coil. The magnetoelectric conversion element(s) may be one or more, if necessary. The number of the field magnet signal processing circuit(s) may be equal to that of the magnetoelectric conversion element (s) for the field magnet.

The magnetoelectric conversion element for the field magnet may be a Hall element, a magnetic resistance element or the like. The Hall element can detect the polarity of the magnetic pole. The Hall element may be of a type containing InSb (indium antimony), InAs (indium arsenic), GaAs (gallium arsenic) or the like. The InSb-contained Hall element can issue a large output signal (Hall voltage). The GaAs-contained Hall element exhibits good thermal characteristics. A Hall IC, in which the magnetoelectric conversion element and the field magnet signal processing circuit are packaged in one chip, may be employed. The Hall IC usually includes a digitizing circuit, and may additionally include an amplifier circuit.

As the movable piece moves, the magnetoelectric conversion element is successively and alternately opposed to the N- and S-type magnetic poles of the field magnet, and issues electric signals corresponding to the intensity and/or direction (polarity of the magnetic pole) of the magnetic field formed by the magnetic poles of the field magnet.

The electric signal issued from the magnetoelectric conversion element is usually an analog signal, which is extremely weak in many cases. The output signal of the magnetoelectric conversion element is converted into a digital form by the field magnet signal processing circuit.

The digitization produces an electric signal of either a large or small value based on, typically, a voltage value of the input electric signal. The digitization can be performed, for example, by comparing between the value of the input electric signal and a predetermined threshold value. This comparison can be performed, for example, by a circuit including a comparator. Alternatively, when the magnetoelectric conversion element issues two kinds of electric signals which are inverted from each other with respect to a predetermined reference value, the digitization can be performed by comparing between these two output signals. These comparison can be performed, e.g., by a differential amplifier. This can suppress an influence by noises which may be superposed on the two output signals of the magnetoelectric conversion element. In any one of the above cases, the comparison may be performed under a hysteresis characteristic. Amplification or the like may be effected on the output signal of the magnetoelectric conversion element before digitization, if necessary.

The foregoing drive circuit utilizes the electric signal, which is issued from the magnetoelectric conversion element for the field magnet and is digitized by the field magnet signal processing circuit, for supplying to the armature coil the current corresponding to, typically, the direction and/or intensity of the magnetic field, which is formed by the field magnet and acts on the armature coil.

The magnetoelectric conversion element for the field magnet or the Hall IC may be arranged on and carried by the electric circuit-board on which the drive circuit is formed.

In the structure wherein the drive circuit, the magnetoelectric conversion element for the field magnet and the field magnet signal processing circuit are arranged on the same electric circuit-board, interconnection distances between these circuits and element can be reduced, which can suppress an influence by noises. Thereby, the drive circuit can precisely control the power supply to the armature coil based on the field magnet signal, and thereby can precisely drive the movable piece. In the prior art, the drive circuit is arranged outside the movable piece and therefore is spaced by a long distance from the magnetoelectric conversion element for the field magnet arranged on the movable piece so that signals are liable to be affected by noises.

Owing to provision of the drive circuit at the electric circuit-board on the movable piece, field magnet information obtained by the magnetoelectric conversion element for the field magnet can be sent on the movable piece to the drive circuit. Accordingly, it is not necessary to employ such a structure that the harness extended from the movable piece contains a cable for transmitting field magnet information obtained by the magnetoelectric conversion element for the field magnet to the drive circuit, as is done in the prior art. Thereby, it is possible to reduce the number of cables in the harness extended from the movable piece.

When the magnetoelectric conversion element for the field magnet is arranged on and carried by the electric circuit-board on which the drive circuit is formed, the electric circuit-board may be arranged on the movable piece such that the position thereof can be adjusted in the lengthwise direction of the stator. This allows easy adjustment of the position, in the lengthwise direction of the stator, of the magnetoelectric conversion element for the field magnet with respect to the armature coil so that a predetermined relationship between the magnetoelectric conversion element and the armature coil may be established easily.

If the magnetoelectric conversion element for the field magnet is the foregoing Hall element and, particularly, the InSb-contained Hall element which can issue a larger output signal than the GaAs-contained Hall element but has inferior thermal characteristics, it is preferable that the Hall element is arranged at a position less affected by a heat. If the stator extends horizontally, the Hall element or the electric circuit-board carrying the Hall element may be arranged at a position vertically under the movable piece or at a lower portion of the movable piece and, particularly, vertically under the armature coil, whereby it is possible to suppress an influence by a heat generated by the energized armature coil.

When the drive circuit energizes the armature coil based on, e.g., the position, in the lengthwise direction of the stator, of the movable piece and/or the moving speed of the movable piece, the linear motor may further include a linear encoder scale extending in the lengthwise direction of the stator and arranged at a fixed position, an encoder sensor arranged on the movable piece and opposed to the encoder scale, and an encoder signal processing circuit for effecting processing (e.g., digitization) on an electric signal issued from the encoder sensor, the encoder signal processing circuit may be formed on the electric circuit-board on which the drive circuit is formed.

In the structure wherein a photosensor including a light emitting element and a photoelectric conversion element is employed as the encoder sensor, the encoder scale may be of an optical type, whereby the optical encoder can be formed. The light emitting element may be a light emitting diode (LED). The photoelectric conversion element may be a photodiode or a phototransistor.

The optical encoder scale may be provided with surfaces having different light reflectances, i.e., high and low reflectances and arranged alternately in the lengthwise direction of the stator. In this case, the light emitting element and the photoelectric conversion element are arranged on the movable piece, and are opposed to the surface of the encoder scale provided with these high and low reflectance surfaces. As the movable piece moves, the light emitting element and the photoelectric conversion element are successively and alternately opposed to the high and low light reflectance surfaces, and the photoelectric conversion element issues an electric signal corresponding to the intensity of the light which is emitted from the light emitting element and is reflected by the high or low reflectance surface.

Alternatively, the optical encoder scale may be provided with surfaces having different properties, i.e., high and low light transmittances arranged alternately in the lengthwise direction of the stator. In this case, the light emitting element and the photoelectric conversion element are arranged on the movable piece, and are opposed to the above surfaces with the encoder scale therebetween. As the movable piece moves, the light emitting element and the photoelectric conversion element are successively and alternately opposed to the high and low light transmittance surfaces, and the photoelectric conversion element issues an electric signal corresponding to the intensity of light which is emitted from the light emitting element and transmitted through the high or low light transmittance surfaces.

In either case, the electric signal issued from the photoelectric conversion element is usually an extremely weak analog signal. This output signal of the photoelectric conversion element is digitized, and thereby is converted into a digital form by the encoder signal processing circuit.

A magnetoelectric conversion element may be employed, instead of the photosensor, as the encoder sensor, in which case the encoder scale of the magnetic type is employed. The magnetoelectric conversion element may be a magnetic resistance element (a so-called MR element) or a Hall element.

The magnetic encoder scale is provided with N- and S-type magnetic poles arranged alternately in the lengthwise direction of the stator. As the movable piece moves, the magnetoelectric conversion element for the encoder is successively and alternately opposed to the N- and S-type magnetic poles, and issues electric signals corresponding to the intensity and/or direction (polarity of the magnetic pole) of the magnetic field formed by the magnetic poles of the magnetic encoder scale.

The electric signal issued from the magnetoelectric conversion element is usually an extremely weak analog signal. The output signal of the magnetoelectric conversion element for the encoder is digitized by the encoder signal processing circuit.

In any one of the above cases, the drive circuit utilizes the encoder signal, which is issued from the encoder signal processing circuit, for drive control (e.g., position control, speed control and PLL control) when the movable piece is driven by energizing the armature coil. The encoder signal can also be utilized for detecting the position and speed of the linearly moving movable piece.

The photosensor including the light emitting element and the photoelectric conversion element for the encoder may be arranged on the electric circuit-board on which the drive circuit is formed. Likewise, the magnetoelectric conversion element for the encoder may be arranged on the electric circuit-board on which the drive circuit is formed.

In the structure wherein the drive circuit, the photosensor or the magnetoelectric conversion element for the encoder, and the encoder signal processing circuit are arranged on the same electric circuit-board, interconnection distances between these circuits, sensor and element can be reduced, which can suppress an influence by noises. Thereby, the drive circuit can precisely control the power supply to the armature coil based on the encoder signal, and thereby can precisely drive the movable piece. In the prior art, the drive circuit is arranged outside the movable piece and therefore is spaced by a long distance from the photosensor or the magnetoelectric conversion element for the encoder arranged on the movable piece so that encoder signal is liable to be affected by noises.

Owing to provision of the drive circuit at the electric circuit-board on the movable piece, encoder information obtained by the photosensor or the magnetoelectric conversion element for the encoder can be sent on the movable piece to the drive circuit. Accordingly, it is not necessary to employ such a structure that the harness extended from the movable piece contains a cable for transmitting encoder information obtained by the photosensor or the magnetoelectric conversion element for the encoder to the drive circuit, as is done in the prior art. Thereby, it is possible to reduce the number of cables in the harness extended from the movable piece.

The input/output harness for the electric circuit-board may be extended in the lengthwise direction of the stator from an end, in the lengthwise direction of the stator, of the electric circuit-board. This facilitates routing of the harness. The input/output harness is employed, e.g., for supplying a power source voltage to circuits formed on the electric circuit-board.

The electric circuit-board may be a single-side board, which reduces a cost compared with a double-side board. The electric circuit-board may be the double-side board, in which case an effective mount area is substantially twice as large as that of the single-side board so that the board can be reduced in size.

(1-2) Image Reader

According to an embodiment of the invention, an image reader for optically scanning and reading an original image, comprises:

a slider carrying an illumination light source for emitting light to the original image and being driven linearly in a predetermined direction;

a stator provided with a field magnet having N- and S-type magnetic poles arranged alternately in the predetermined direction;

a movable piece having an armature coil opposed to the field magnet, being movable along the stator, and coupled to the slider; and a drive circuit for energizing the armature coil and thereby driving the movable piece, wherein the drive circuit is formed at an electric circuit-board arranged on the movable piece.

This image reader can be utilized, e.g., as an image scanner. The image reader can be arranged, e.g., in a copying machine.

In this image reader, the slider carrying optical parts such as the illumination light source is driven linearly in the predetermined direction for optically scanning and reading the original image arranged at the predetermined position. The illumination light source may be an illumination lamp such as a fluorescent lamp.

For driving the slider carrying the optical parts in the predetermined direction, the image reader has the stator having the field magnet, the movable piece having the armature coil, and the drive circuit for energizing the armature coil and thereby driving the movable piece. The drive circuit is formed on the electric circuit-board arranged on the movable piece. This linear motor is of the shaft type already described in the item (1-1).

The movable piece is coupled to the slider carrying the optical parts including the illumination lamp. The linear motor can operate to drive the slider in the predetermined direction.

In the image reader of the invention, the linear motor according to the invention drives the slider so that cables in a harness extended from the movable piece can be reduced in number compared with the prior art, as already described in the foregoing item (1-1). This facilitates routing of the harness extended from the movable piece in the image reader. The contents discussed in connection with the foregoing item (1-1) can be true also with respect to the linear motor employed in the image reader of the invention. The same effects can be achieved.

In the structure employing the illumination lamp as the illumination light source, a lamp turn-on circuit for turning on the illumination lamp may be formed at the electric circuit-board, on which the drive circuit is formed, arranged on the movable piece.

(2) Examples of the linear motor and image reader according to the invention will be described below with reference to the drawings.

Figure 2:
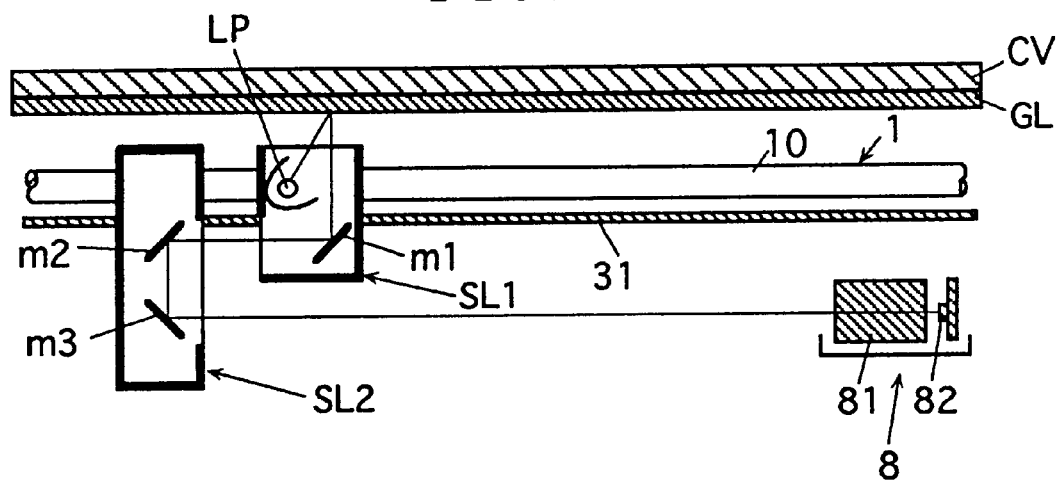
FIG. 2 is a schematic cross section of the image reader taken along line X—X in FIG. 1.
Figure 3:
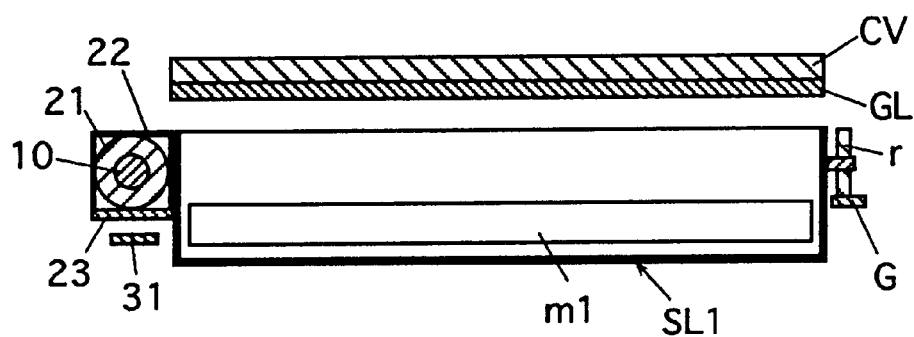
FIG. 3 is a schematic cross section of the image reader taken along line Y—Y in FIG. 1.

FIGS. 1 to 3 show an example of an image reader according to the invention. FIG. 1 is a schematic plan of the image reader. FIG. 2 is a schematic cross section of the image reader taken along line X—X in FIG. 1. FIG. 3 is a schematic cross section of the image reader taken along line Y—Y in FIG. 1.

The image reader shown in FIGS. 1 to 3 employs linear motors of the invention for driving two sliders carrying optical parts, respectively, as described later.

This image reader is provided at its upper portion with a transparent platen glass GL on which an original is laid. An openable cover CV, which is not shown in FIG. 1, is arranged over the platen glass GL. Two sliders SL1 and SL2, which are movable in parallel with the platen glass GL and carry optical parts, are arranged under the platen glass GL for optically scanning the original on the platen glass GL.

The slider SL1 is coupled to a movable piece 2 of the linear motor LMa, and the slider SL2 is coupled to the movable piece 2 of the linear motor LMb. These linear motors LMa and LMb have the substantially same structures except for a part of circuits which are formed on the electric circuit-board attached to the movable piece 2, as will be described later more in detail. Each movable piece 2 is movably fitted around a shaft member 10 which is parallel to the platen glass GL and, more specifically, is parallel to the direction in which the sliders SL1 and SL2 are to be moved. The shaft member 10 is provided with a field magnet, and is arranged at the fixed position.

The shaft member 10 provided with the field magnet forms a stator 1 common to both the linear motors LMa and LMb. Each movable piece 2 has an armature coil 21 fitted around the stator 1. Each of the linear motors LMa and LMb is of a so-called moving coil type.

When the armature coil 21 of the linear motor LMa is energized, the movable piece 2 having the armature coil 21 is driven along the stator 2 owing to an interaction between a current flowing through the coil 21 and a magnetic field formed by the field magnet on the shaft member 10. When the armature coil 21 of the linear motor LMb is energized, the movable piece 2 is likewise driven along the stator 2.

The slider SL1 carries optical parts, i.e., an illumination lamp LP for emitting light to the original laid on the platen glass GL and a reflection mirror m1 for leading the light reflected by the original toward the slider SL2. The illumination lamp LP in this embodiment is a fluorescent lamp. A roller r is arranged at an end of the slider SL1 remote from the end coupled to the movable piece 2 of the linear motor LMa. The roller r can roll on a plate-like guide member G which is arranged parallel to the platen glass GL and the stator 1. Owing to the above structure, the slider SL1 can keep a stable attitude during movement.

The slider SL2 carries optical parts, i.e., reflection mirrors m2 and m3 leading the image light, which is reflected by the reflection mirror m1 on the slider SL1, to a reading unit 8. The slider SL2 has a roller r at the same position as the slider SL1, and therefore can keep a stable attitude during movement.

The reading unit 8 has a lens 81 for focusing the image light coming from the reflection mirror 3 on the slider SL2, and a CCD 82 for reading the focused image light. Instead of the reading unit 8, the image reader may employ, e.g., reflecting means for leading the light reflected by the mirror m3 toward a photosensitive member for image formation, whereby the image reader can be applied to an analog copying machine.

When reading the original laid at a predetermined position on the platen glass GL, the illumination lamp LP on the slider SL1 is turned on, and the sliders SL1 and SL2 are driven parallel to the platen glass GL by the linear motors LMa and LMb coupled thereto, respectively, for entirely scanning the original. The sliders SL1 and SL2 are driven at a speed ratio, e.g., of 2:1. The light which is emitted from the illumination lamp LP and is reflected by the original is successively led by the mirrors m1, m2 and m3 to the reading unit 8. In the reading unit 8, the reflected light coming from the original is focused on the CCD 82 by the focusing lens 81, and the original image is successively read by the CCD 82.

Description will now be given specifically on the linear motors LMa and LMb coupled to the sliders SL1 and SL2 for driving them, respectively. As already described, these linear motors have the substantially same structures except for a part of circuits formed on the electric circuit-board attached to the movable piece 2. Therefore, the linear motor LMa will be discussed below.

Figure 4:
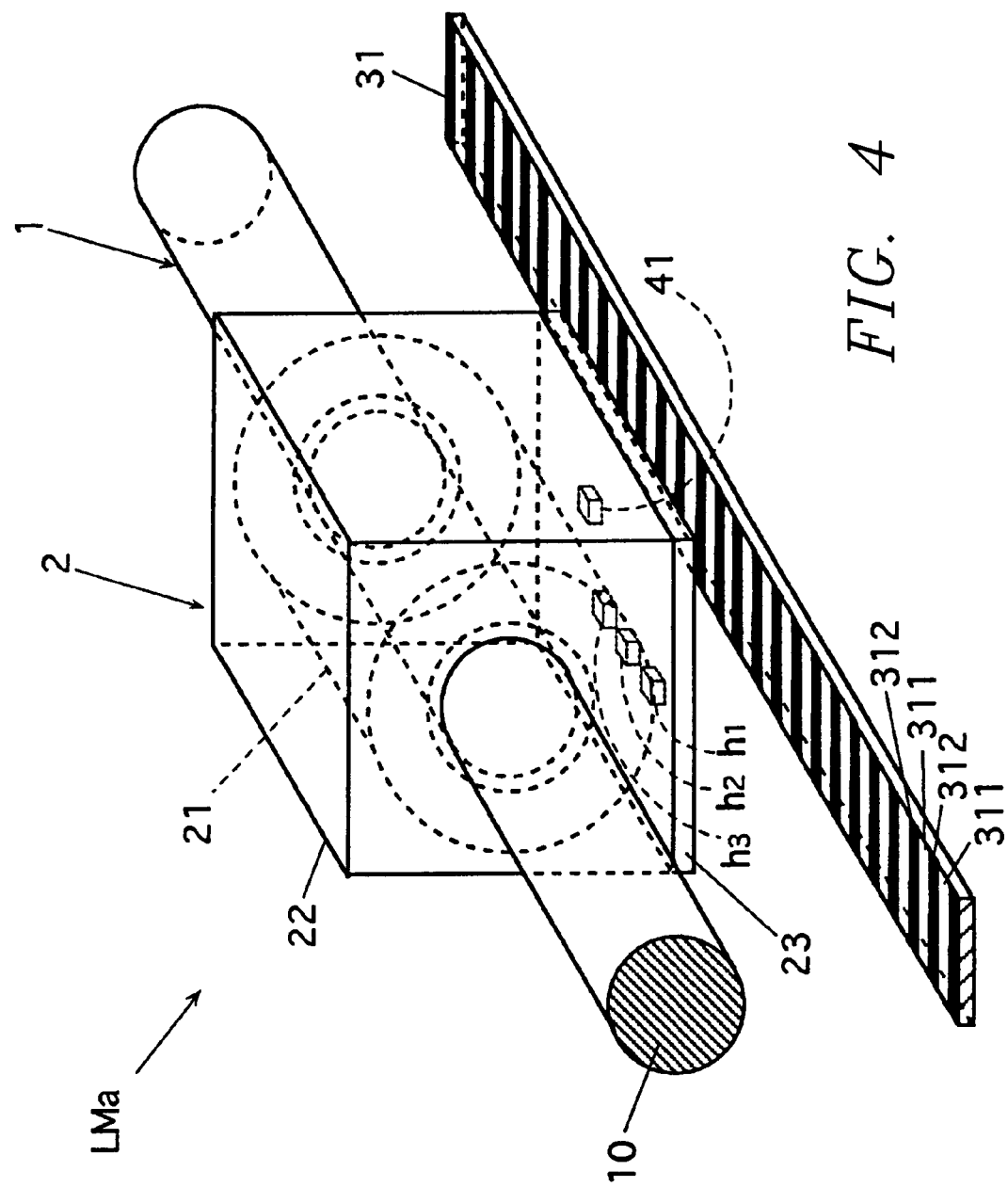
FIG. 4 is a schematic perspective view showing an example of a linear motor according to the invention.
Figure 5:
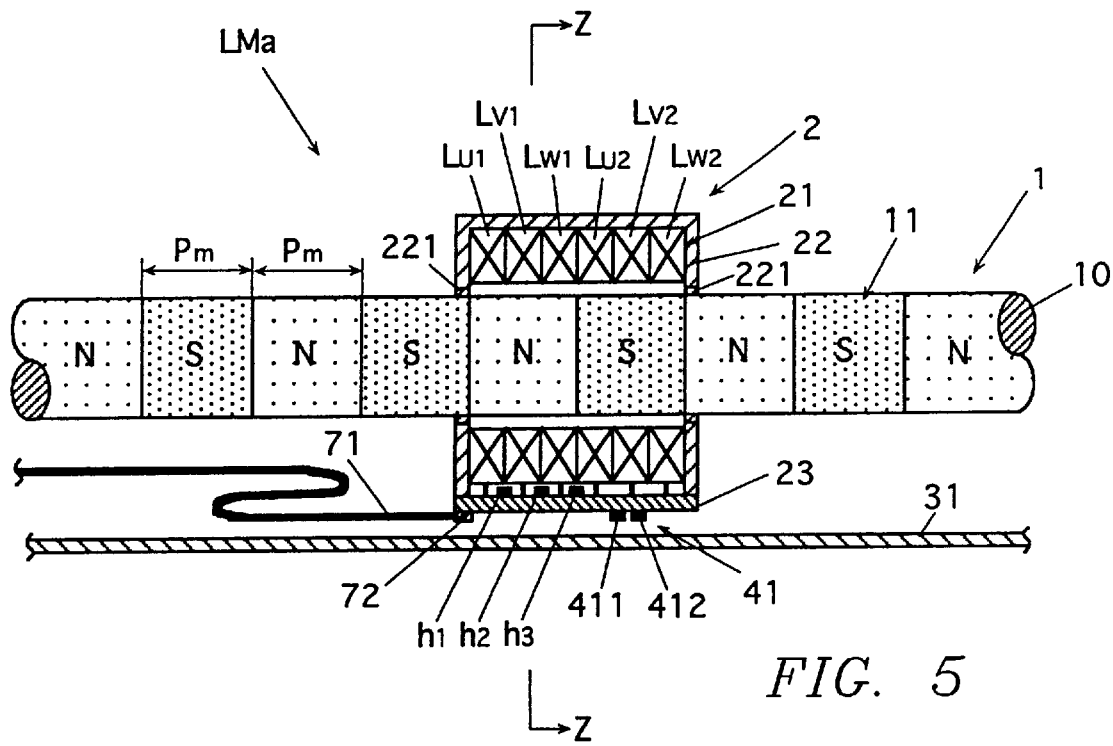
FIG. 5 is a fragmentary schematic cross section of the linear motor shown in FIG. 4.
Figure 6:
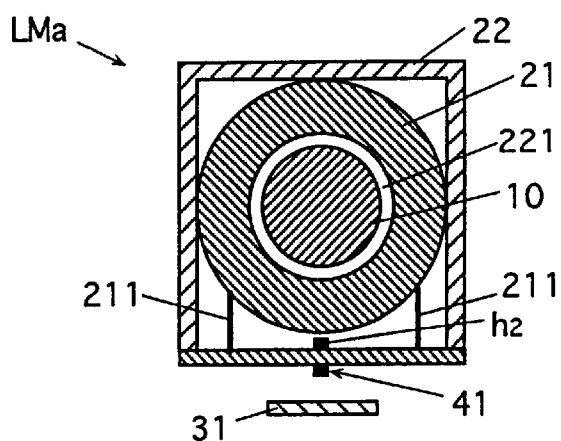
FIG. 6 is a schematic cross section of the linear motor taken along line Z—Z in FIG. 5.

FIG. 4 is a schematic perspective view of the linear motor LMa. FIG. 5 is a schematic cross section of the linear motor Lma. FIG. 6 is a schematic cross section of the linear motor LMa taken along line Z—Z in FIG. 5.

The linear motor LMa is of a so-called shaft type.

The linear motor LMa has the linearly extending shaft member 10 provided with the field magnet and the armature coil 21 fitted around the shaft member 10. In the linear motor LMa, the shaft member 10 provided with the field magnet forms the stator arranged at a fixed position, and the armature coil 21 forms a major component of the movable piece which is movable along the stator. Thus, the linear motor LMa is of a so-called moving coil type. The linear motor LMa further has an encoder scale 31 arranged parallel to the shaft member 10.

Figure 7:
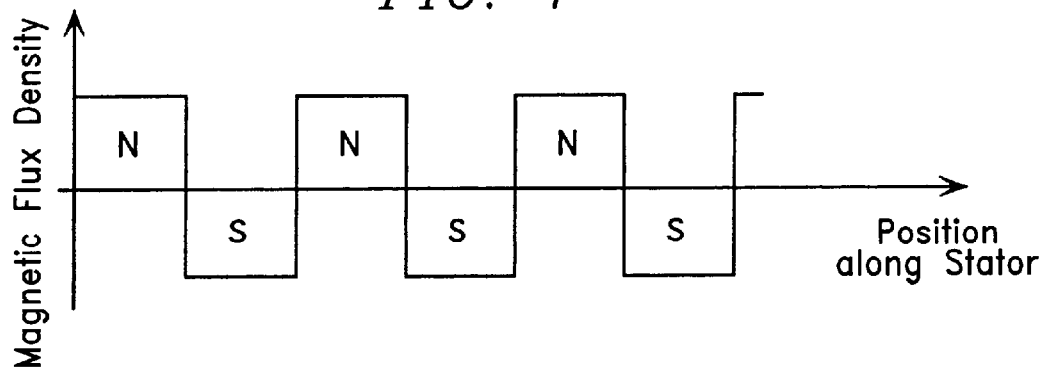
FIG. 7 shows an example of a distribution of magnetic fluxes formed in a lengthwise direction of the stator by a field magnet.

The shaft member 10 is made of a machinable and magnetizable material such as metal containing Fe-Cr or Mn-Al. The shaft member 10 has a circular section and a machined smooth surface. The shaft member 10 is magnetized to provide a distribution of magnetic fluxes with an equal pitch in its lengthwise direction and preferably of a substantially square waveform as shown in FIG. 7. The shaft member 10 magnetized in this manner is provided with a field magnet 11 having N- and S-type magnetic poles which are arranged alternately along its lengthwise direction and have equal magnetic pole widths (lengths in the lengthwise direction of the stator). In this embodiment, each magnetic pole of the field magnet 11 has a width Pm of 30 mm in the lengthwise direction of the stator.

The shaft member 10 extends horizontally, and is supported at a fixed position by supports (not shown) supporting opposite ends thereof, respectively. The shaft member 10, which is arranged at the fixed position and is provided with the field magnet 11 as described above, forms a stator 1 of the linear motor LMa.

The armature coil 21 has two coil groups each including three, i.e., U-, V- and W-phase coils. The two, i.e., first and second coil groups are arranged successively in the lengthwise direction of the stator. The first coil group is formed of coils $L_{U1}$, $L_{V1}$ and $L_{W1}$ arranged in this order in the lengthwise direction of the stator. The second coil group is formed of coils $L_{U2}$, $L_{V2}$ and $L_{W2}$ arranged in this order in the lengthwise direction of the stator. Each of the coils in the first and second groups has an annular form, and is fitted around the stator 1. Each coil in this embodiment has a width equal to ⅓ of the magnetic pole width Pm, although not restricted to this. The center of each of these coils is shifted by Pm/3 in the lengthwise direction of the stator from the center of the neighboring coil. These coils forming the armature coil 21 in this embodiment are coated with adhesive and thereby are integrated with each other.

The armature coil 21 is arranged in a space within a hollow frame 22 of a rectangular parallelepiped form having one open side (i.e., lower side). The armature coil 21 is carried on the inner surface of the frame 22 and is integrated with the same. The frame 22 carries bearings 221 on its opposite ends in the lengthwise direction of the stator. The bearings 221 are slidably fitted around the stator 1 so that the armature coil 21 and the frame 22 integrated together can smoothly move along the stator 1. The integrated armature coil 21 and frame 22 form the movable piece 2 of the linear motor LMa.

An electric circuit-board 23 is fixed to the frame 22 of the movable piece 2 and covers the lower opening of the frame 22. Opposite terminals 211 of each coil of the armature coil 21 are electrically connected to an interconnection pattern formed at the electric circuit-board 23 for providing a predetermined connection among these coils. An electric circuit formed of the interconnection pattern formed on the electric circuit-board 23 and the respective coils will be described below.

For controlling the power supply to the respective coils of the armature coil 21, three Hall elements $h_1$, $h_2$ and $h_3$ are arranged on the movable piece 2. The Hall element is a kind of magnetoelectric conversion element which can issue an electric signal corresponding to a polarity of a magnetic pole. These Hall elements are used for detecting positional relationships, in the lengthwise direction of the stator, between the respective coils of the armature coil 21 and the magnetic poles of the field magnet 11, and for detecting the polarities of the magnetic poles of the field magnet to which the respective coils oppose, respectively. These Hall elements on the movable piece are located at positions which are radially outside the armature coil 21 and are opposed to the field magnet 11, respectively, and more specifically are located at the following positions in the lengthwise direction of the stator. The Hall element $h_1$ is arranged at the position shifted, in the lengthwise direction of the stator, rightward in FIG. 5 from the center of the coil $L_{U1}$ by Pm/6. Likewise, the Hall element $h_2$ is arranged at the position shifted rightward in FIG. 5 from the center of the coil $L_{V1}$ by Pm/6. The Hall element $h_3$ is arranged at the position shifted rightward in FIG. 5 from the center of the coil $L_{W1}$ by Pm/6.

These Hall elements are carried by the foregoing electric circuit-board 23. More specifically, these Hall elements are carried on the surface of the electric circuit-board 23 opposed to the field magnet 11.

Figure 8:
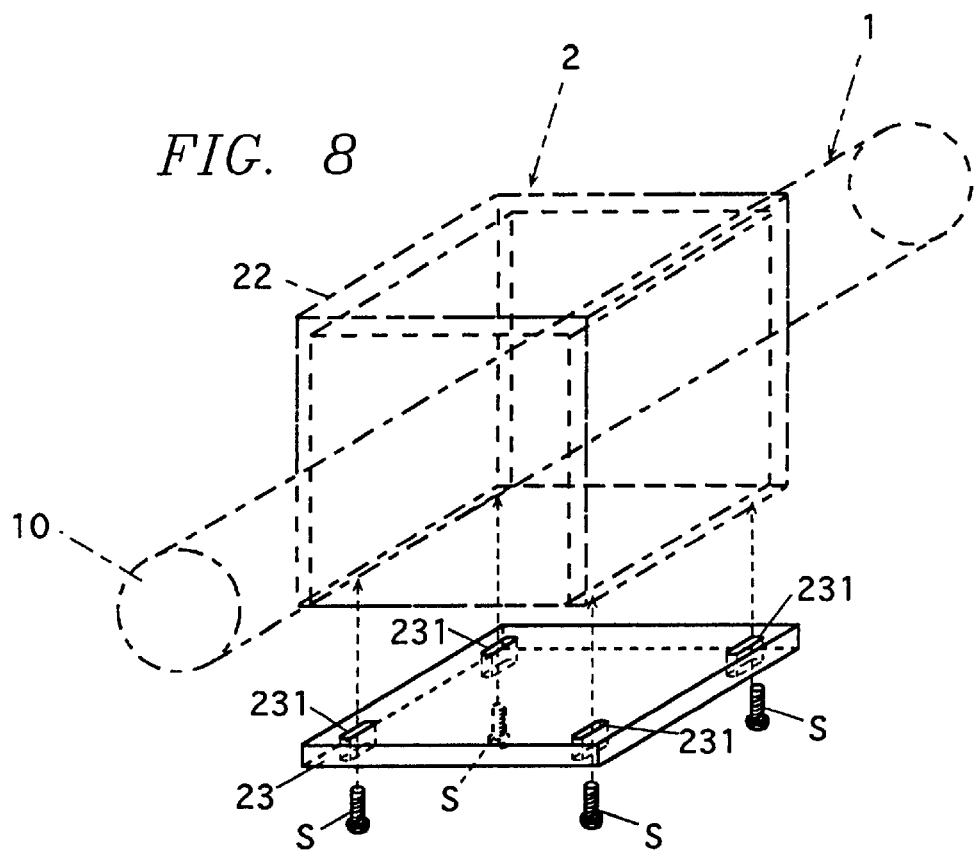
FIG. 8 shows a manner of mounting an electric circuit-board on a frame of the movable piece.

The electric circuit-board 23 is provided at its four corners with apertures 231 as shown in FIG. 8. Screws S inserted through the apertures 231 are engaged with the frame 22 to fix the electric circuit-board 23 to the frame 22. Each aperture 231 is oblong in the lengthwise direction of the stator so that the position of the electric circuit-board 23 on the frame 22 can be adjusted in the lengthwise direction of the stator. Thereby, the positions of the Hall elements $h_1$, $h_2$ and $h_3$ with respect to the coils $L_{U1}$, $L_{V1}$ and $L_{W1}$ in the lengthwise direction of the stator can be easily adjusted to achieve the foregoing relationship. The electric circuit-board 23 also carries a field magnet signal processing circuit for effecting processing such as digitization on the output signals of the respective Hall elements. The output signal lines of the Hall elements are connected to the field magnet signal processing circuit. The field magnet signal processing circuit will be described later.

The encoder scale 31 in this embodiment is of an optical type, and has surfaces 311 having a high reflectance and surfaces 312 having a low reflectance, which are arranged alternately in the lengthwise direction of the stator. In this embodiment, the two kinds of surfaces of different reflectances are arranged in the lengthwise direction of the stator with a pitch of 100 $\mu$m. The encoder scale 31 has the opposite ends carried by supports (not shown), and is arranged at a fixed position vertically under the movable piece 2.

An photosensor 41 is arranged on the movable piece 2 and is located at a position opposed to the encoder scale 31. More specifically, the optical sensor 41 is arranged on the lower surface of the electric circuit-board 23, which is fixed to the frame 22 of the movable piece 2 and carries the Hall elements $h_1$, $h_2$ and $h_3$ on its upper surface. The photosensor 41 in this embodiment includes a light emitting element (light emitting diode in this embodiment) 411 which emits light toward the encoder scale 31, and a kind of a photoelectric conversion element, i.e., a photodiode 412 which receives light emitted from the light emitting element 411 and reflected by scale 31, and can issue an electric signal corresponding to the quantity of received light. The electric circuit-board 23 is provided with an encoder signal processing circuit, which effects processing such as digitization on the output signal of the photodiode 412, and therefore the output signal line of the photodiode 412 is connected to this encoder signal processing circuit. The encoder signal processing circuit will be described later.

Figure 9:
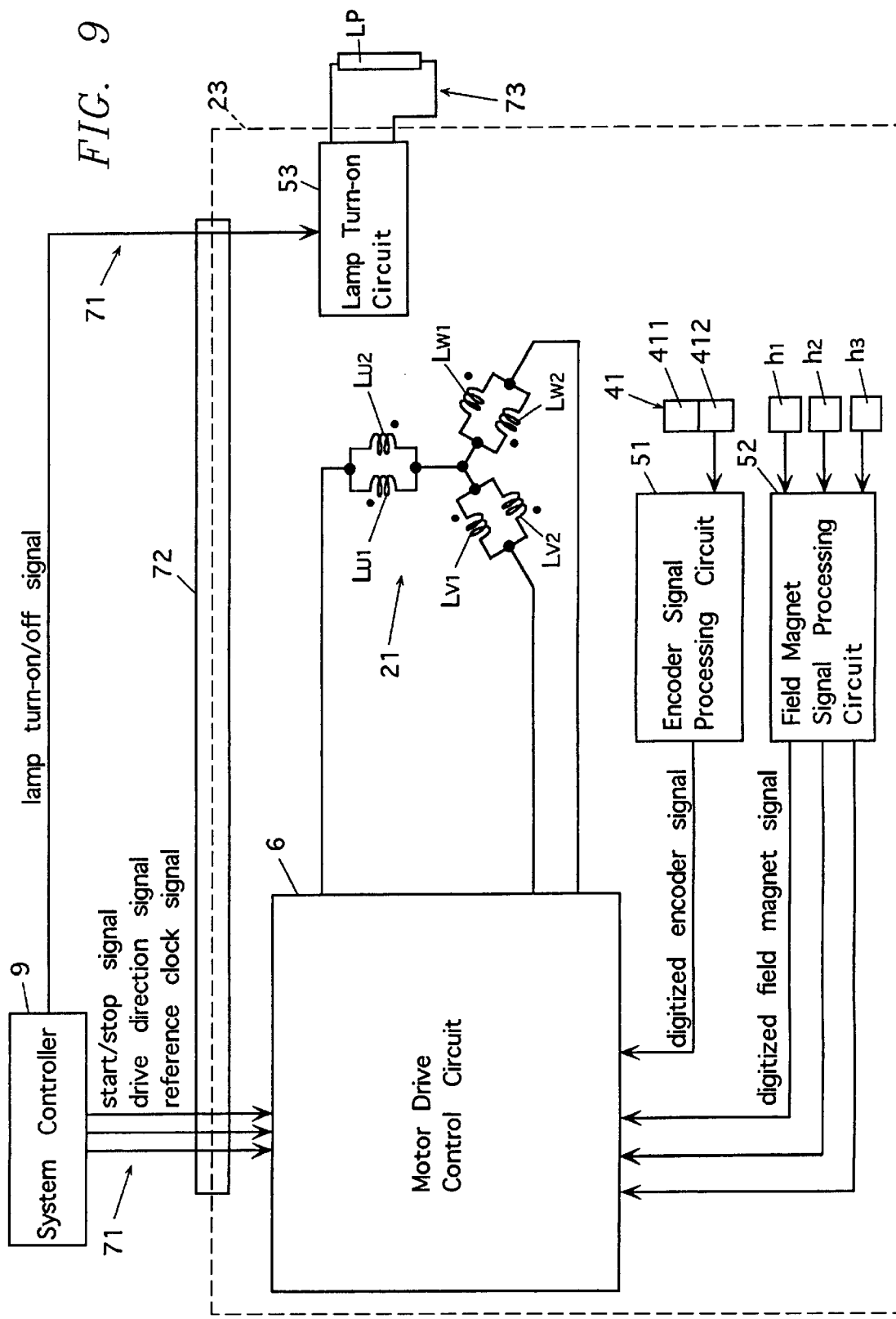
FIG. 9 is a schematic block diagram showing an example of a circuit on an electric circuit-board of the linear motor.

FIG. 9 is a schematic block diagram of an electric circuit formed on the electric circuit-board 23.

On the electric circuit-board 23, as already described, the predetermined connection is formed among the respective coils of the armature coil 21 by the interconnection pattern formed on the electric circuit-board 23. The electric circuit-board 23 is further provided with the encoder signal processing circuit 51 which can digitize the output signal of the photodiode 412 of the photosensor 41, and the field magnet signal processing circuit 52 which can digitize the respective output signals of the Hall elements $h_1$, $h_2$ and $h_3$. The electric circuit-board 23 also carries a motor drive control circuit 6 which controls the power supply to the armature coil 21 based on the encoder signal and the field magnet signal sent from the encoder signal processing circuit 51 and the field magnet signal processing circuit 52. The motor drive control circuit 6 includes a so-called motor drive IC.

The electric circuit-board 23 attached to the movable piece 2, which is coupled to the slider SL1 carrying the illumination lamp LP, of the linear motor LMa is further provided with a lamp turn-on circuit 53 for turning on the illumination lamp LP. The electric circuit-board 23 attached to the movable piece 2, which is coupled to the slider SL2, of the linear motor LMb is provided with the circuits already described except for the lamp turn-on circuit 53. Thus, the electric circuit-board of the linear motor LMa coupled to the slider SL1 differs from the electric circuit-board of the linear motor LMb coupled to the slider SL2 in that it carries the lamp turn-on circuit 53.

The motor drive circuit 6 and the lamp turn-on circuit 53 formed at the electric circuit-board on the movable piece 2 operate to drive the motor and turn on the illumination lamp LP, respectively, based on instructions sent from a system controller 9, which is arranged at a fixed position outside the movable piece 2 for controlling a whole operation of the image reader.

The system controller 9 outside the movable piece 2 is connected to the circuits formed at the electric circuit-board 23 on the movable piece 2 through a harness 71. The harness 71 is connected to the electric circuit-board 23 via a pair of connectors 72.

In this embodiment, the harness 71 transmits the following signals and others. A power source voltage is supplied to circuits including the Hall elements and the photosensor 41 on the electric circuit-board 23. To the motor control circuit 6, the system controller 9 sends a start/stop signal instructing start and stop of the motor driving, a drive direction signal indicating an intended drive direction and a reference clock signal. Further, the system controller 9 sends a lamp turn-on/off signal instructing turn-on or turn-off of the illumination lamp LP to the lamp turn-on circuit 53.

The circuits described above on the electric circuit-board 23 will be successively described below in more detail.

The U-, V- and W-phase coils $L_{u1}$, $L_{V1}$ and $L_{W1}$ in the first coil group of the armature coil 21 as well as the U-, V- and W-phase coils $L_{U2}$, $L_{V2}$ and $L_{W2}$ in the second coil group thereof are connected as follows. Parallel connections are made between the coils of the same phases in the first and second coil groups, i.e., between the U-phase coils, between the V-phase coils and between the W-phase coils, respectively. These parallel-connected coil pairs are star-connected. Solid circles depicted near the coils in FIG. 9 represent coil winding directions with respect to the stator 1, respectively. The current direction, with respect to the stator 1, of the coil with solid circle depicted at its upstream end, in the current flow direction, is opposite to the current direction of the coil with solid circle depicted at its downstream end.

Compared with the case of employing soldering or the like for achieving the above connection, the embodiment employing the interconnection pattern arranged on the electric circuit-board 23 can easily achieve the above connection. If the respective coils are connected in the foregoing manner by the soldering or the like, several or many cables or wires are gathered at one or some connection points so that it is difficult to form an intended connection structure and also an operation for connection is difficult. Further, the embodiment employing the electric circuit-board 23 for the connection can reduce a possibility of an error and a failure in connection.

Figure 10:
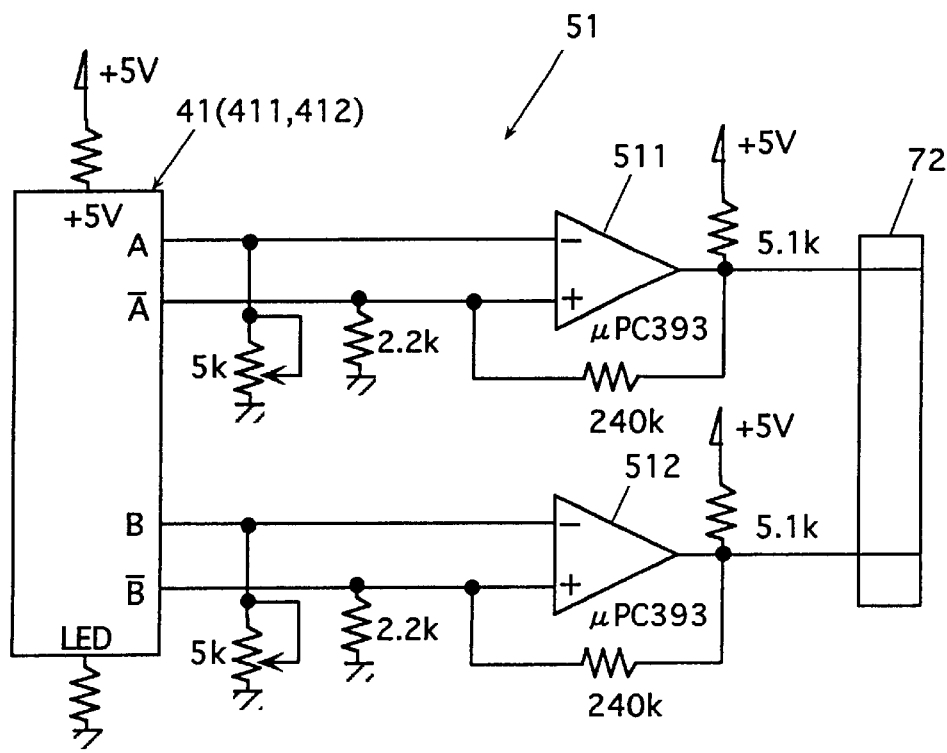
FIG. 10 shows an example of an encoder signal processing circuit.

The encoder signal processing circuit 51 is employed for producing a digital signal by converting the electric signal issued from the photodiode 412 of the photosensor 41 into a digital form. FIG. 10 shows the encoder signal processing circuit 51.

The photosensor 41 includes the light emitting element 411 and the two photoelectric conversion elements, i.e., two photodiodes 412, all of which are packaged in one chip. The two photodiodes 412 are shifted from each other by half the pitch of the encoder scale 31 in the lengthwise direction of the stator so that they can issue signals having phases shifted by 90 degrees from each other. In FIG. 5, one of the photodiodes 412 is not shown. The photosensor 41 issues an A-phase signal and a B-phase signal, i.e., signals having phases shifted by 90 degrees from each other. The photosensor 41 also issues an $\overline{A}$-phase signal and a $\overline{B}$-phase signal which are inverted signals of the A- and B-phase signals, respectively. The A- and $\overline{A}$-phase signals are converted by a comparator 511 into digital forms, respectively. The B- and $\overline{B}$-phase signals are converted by a comparator 512 into digital forms, respectively. The comparators 511 and 512 in this embodiment are μPC393 manufactured by Nippon Denki Co.

Detection of the position and/or speed of the movable piece 2 as well as the drive control thereof can be performed based on signals digitized by the encoder signal processing circuit 51. In this embodiment, the encoder signals digitized by the encoder signal processing circuit 51 are utilized for PLL control (phase-locked loop control) by the motor drive control circuit 6, as will be described later.

Figure 11:
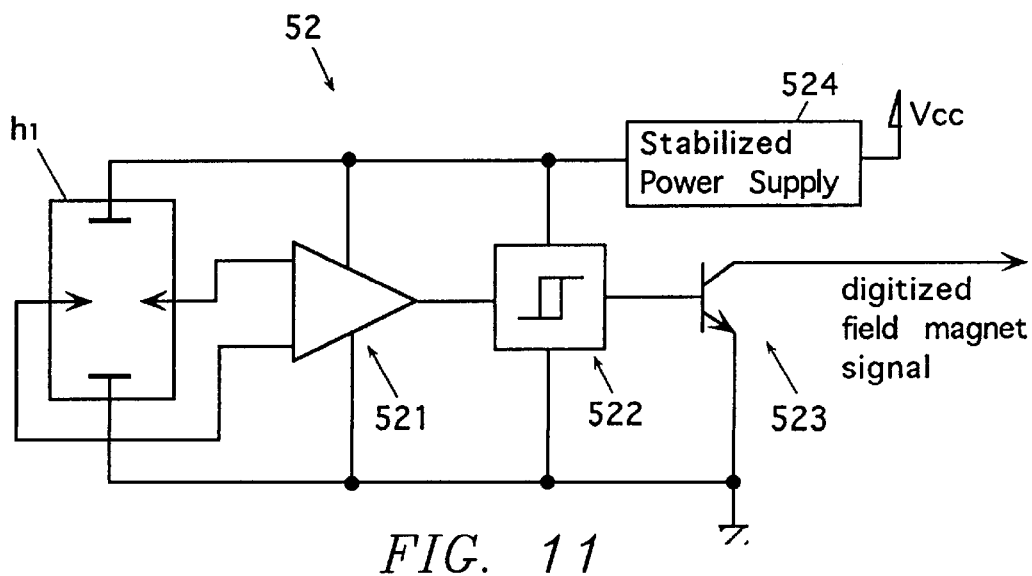
FIG. 11 shows an example of a field magnet signal processing circuit.

The field magnet signal processing circuit 52 is employed for digitizing each of electric signals issued from the Hall elements $h_1$, $h_2$ and $h_3$ to convert them into digital forms. The field magnet signal processing circuit 52 is shown in FIG. 11.

In this embodiment, the output signal of the Hall element $h_1$ is amplified by an amplifier 521, is converted into a digital form under a hysteresis characteristic by a Schmitt trigger circuit 522, and is issued as the field magnet signal via a transistor 523. The Hall element $h_1$ is supplied with the power supply voltage via a stabilized power supply 524. The field magnet signal processing circuit 52 has circuit structures, each of which is the same as that described above, for the respective Hall elements.

In this embodiment, based on the field magnet signal digitized by the field magnet signal processing circuit 52, the motor drive control circuit 6 controls the power supply to the armature coil 21 as will be described later.

The Hall elements and the field magnet signal processing circuit which are independent from each other may be replaced with a Hall IC containing these elements and circuit packaged in one chip. The Hall IC containing the Hall elements and the field magnet signal processing circuit shown in FIG. 11 may be a DN6846S manufactured by Matsushita Denki Sangyo Co., Ltd.

Figure 12:
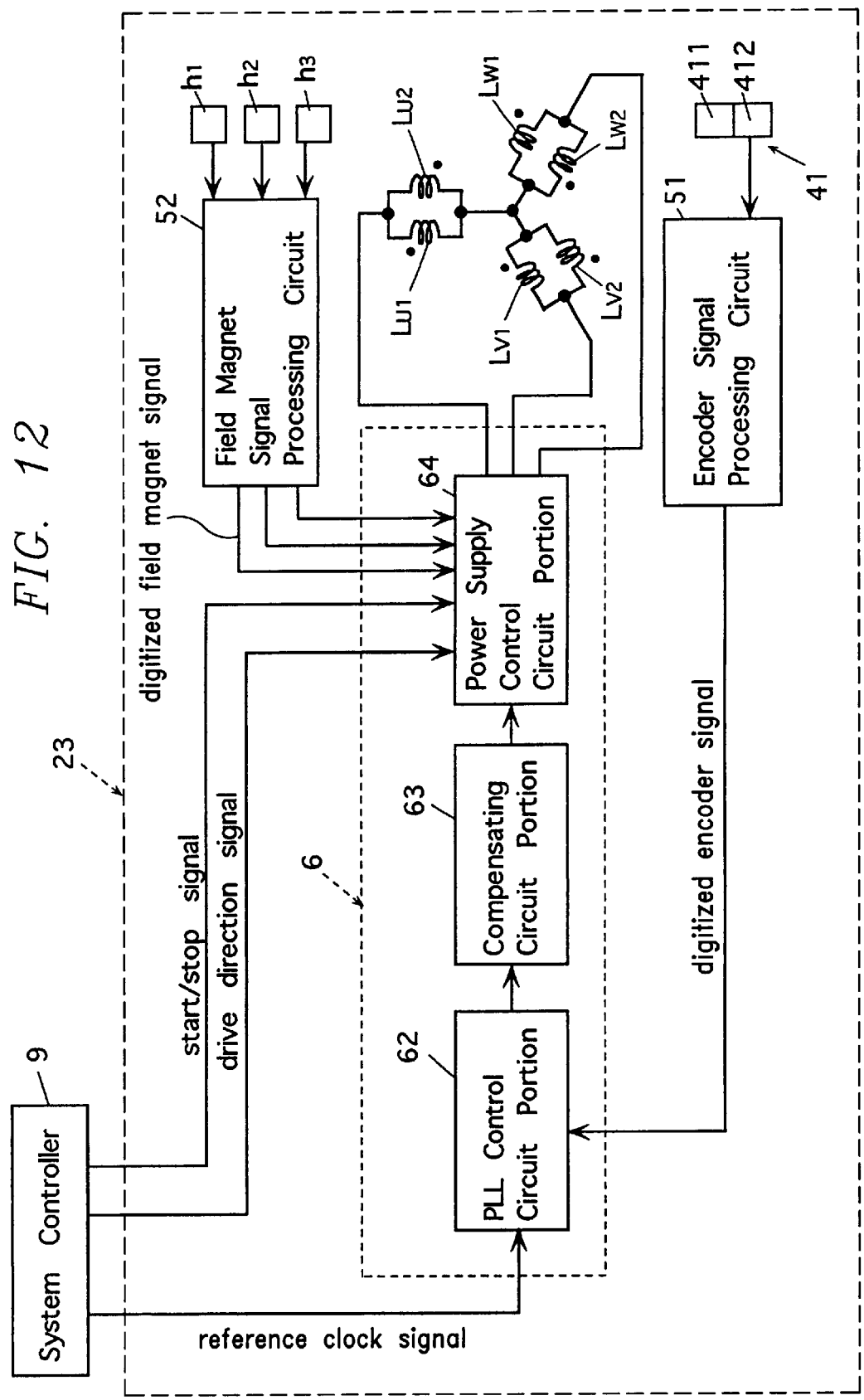
FIG. 12 is a schematic block diagram showing an example of a motor drive circuit.

FIG. 12 is a schematic block diagram showing an internal structure of the motor drive control circuit 6.

The motor drive control circuit 6 has a PLL control circuit (phase-locked loop control circuit) portion 62, a compensating circuit portion 63 and a power supply control circuit portion 64.

The PLL control circuit portion 62 receives from the system controller 9 a reference clock signal of a frequency corresponding to an intended speed of the movable piece 2.

The PLL control circuit portion 62 also receives a feedback encoder signal indicating an actual moving speed of the movable piece 2. This signal is issued from the optical sensor 41 and is digitized by the encoder signal processing circuit 51.

The PLL control circuit portion 62 issues a signal corresponding to a phase difference between the reference clock signal sent from the system controller 9 and the encoder signal indicating the actual moving speed sent from the encoder signal processing circuit 51.

The compensating circuit portion 63 compensates an advance or delay in the transmission system, and the compensated signal corresponding to the phase difference between the reference clock signal and encoder signal is sent to the current supply control circuit portion 64.

The current supply control circuit portion 64 supplies a constant current to each coil based on the field magnet signal, which is issued from each Hall element and is digitized by the field magnet signal processing circuit 52. These constant currents for the respective coils correspond to the compensated signals described above, respectively, and are supplied in accordance with the timings shown in FIGS. 13 and 14. Thereby, the coil of each phase is supplied with the current, which acts to match the phase of the signal corresponding to the actual moving speed of the movable piece with that of the reference clock signal corresponding to the intended speed, so that the movable piece 2 can be driven at the intended speed.

Figure 13:
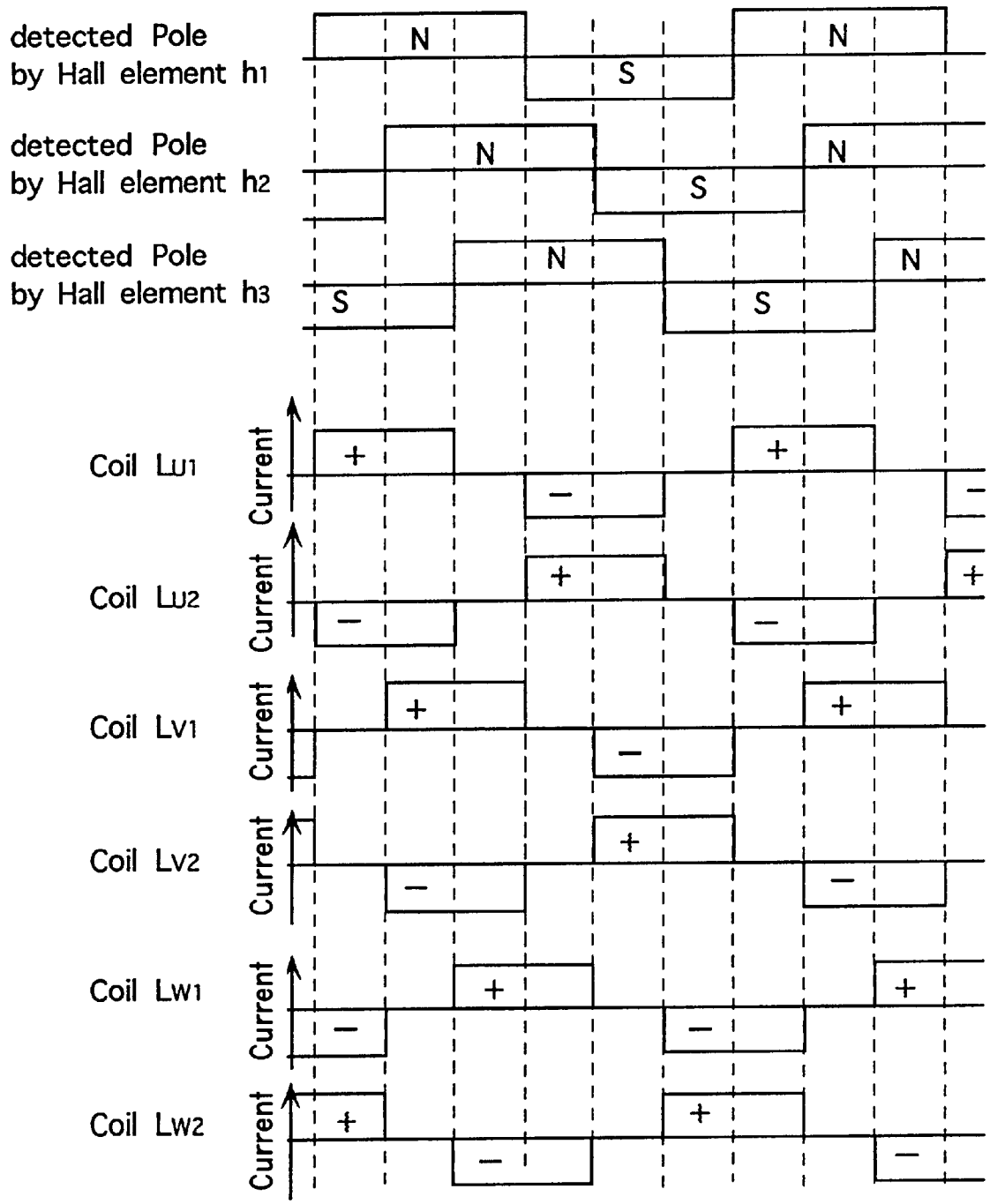
FIG. 13 shows a relationship between magnetic poles detected by respective Hall elements and timings for energizing respective coils in an operation of driving the movable piece of the linear motor in FIG. 5 leftward in FIG. 5.
Figure 14:
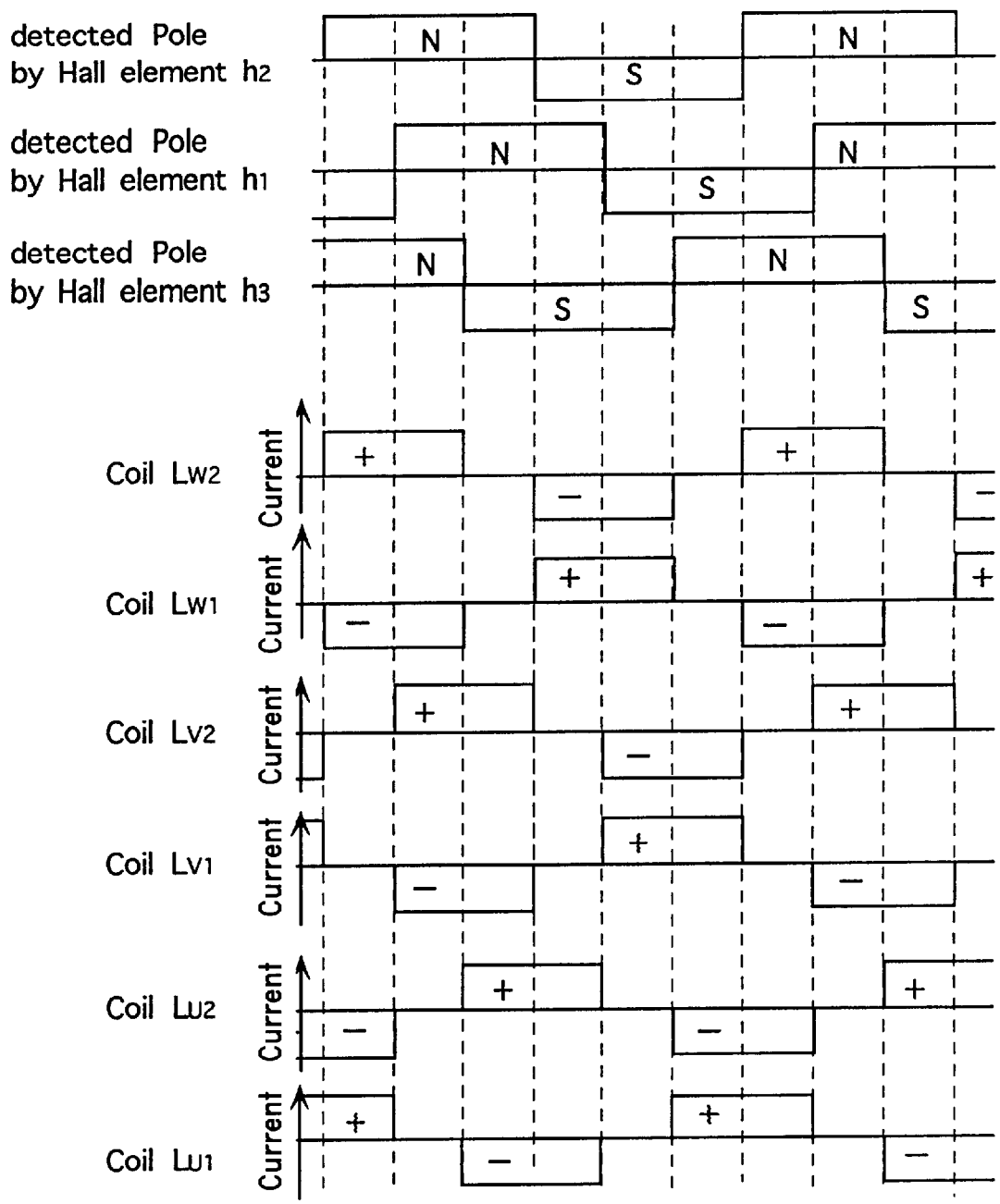
FIG. 14 shows a relationship between magnetic poles detected by respective Hall elements and timings for energizing respective coils in an operation of driving the movable piece of the linear motor in FIG. 5 rightward in FIG. 5.

FIG. 13 shows timings for supplying the currents to the respective coils in the operation of driving the movable piece 2 leftward in FIG. 5. FIG. 14 shows timings for supplying the currents to the respective coils in the operation of driving the movable piece 2 rightward in FIG. 5. According to these current supply timings, each coil is supplied with the constant current to produce an electromagnetic force in the drive direction while the center, in the lengthwise direction of the stator 1, of the each coil moves from an upstream position shifted, in the drive direction, by Pm/6 from the upstream end, in drive direction, of the magnetic pole of the field magnet 11 to a position shifted by 2Pm/3 in the drive direction from the upstream position. While each coil is being energized, the coil is entirely or partially opposed to only one of the magnetic poles (N- and S-type magnetic poles) and is not opposed to both the N- and S-type magnetic poles. Therefore, the current supplied to each coil is not converted into a electromagnetic force which drives the movable piece 2 in a direction opposite to the intended direction, and is entirely converted into a drive force driving the movable piece 2 in the intended direction. Accordingly, the drive efficiency is high. By the similar reasons, a variation in drive force hardly occurs when the movable piece 2 moves along the stator 1.

Figure 15:
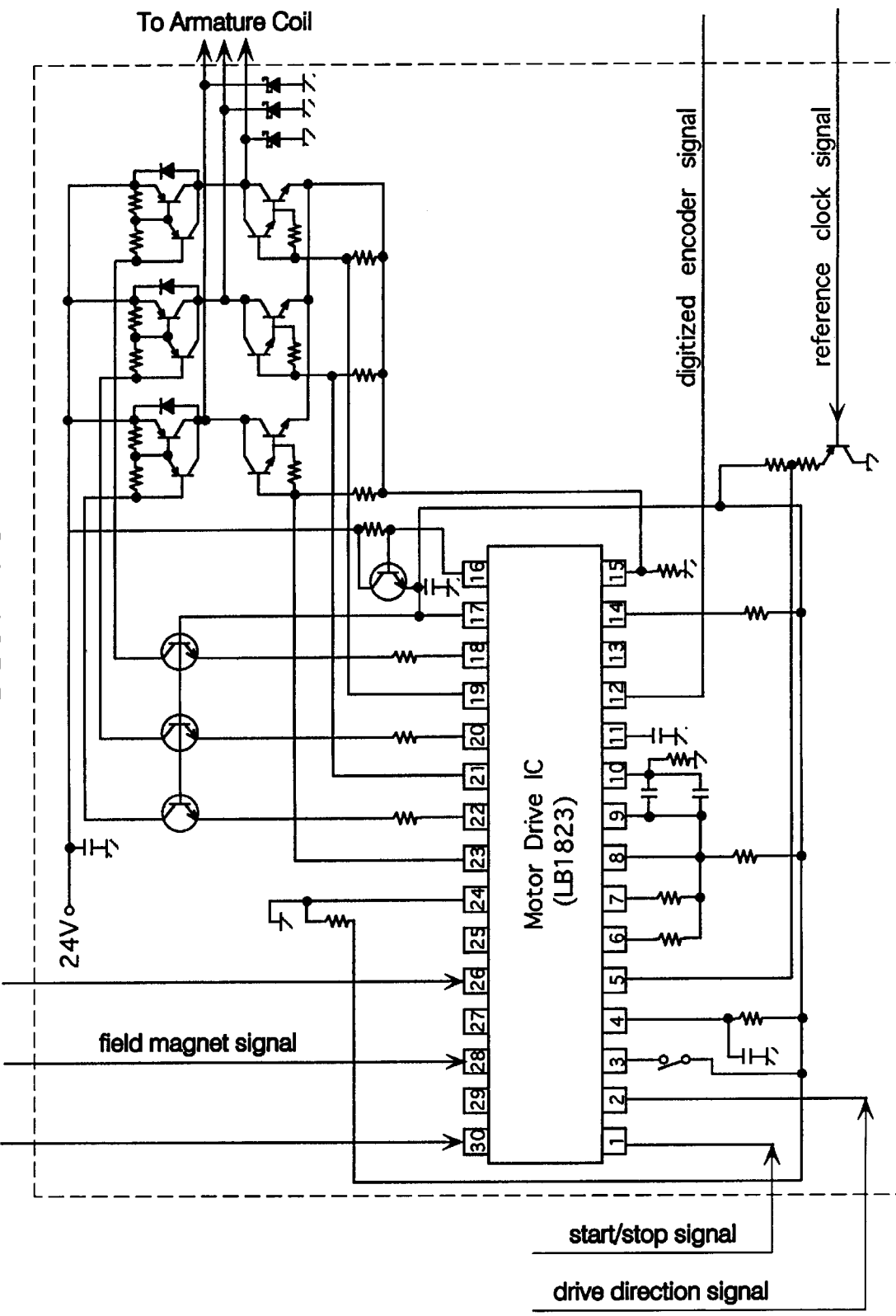
FIG. 15 shows more specifically an example of a motor drive circuit.

FIG. 15 shows more specifically the above motor drive control circuit. The motor drive control circuit shown in FIG. 15 is primarily formed of a motor drive IC including the PLL control circuit portion 62 and the compensating circuit portion 63 described above. In this embodiment, the motor drive IC is LB1823 manufactured by Sanyo Denki Co., Ltd.

In the linear motors LMa and LMb of the invention, as described above, the motor drive control circuit including the motor drive IC is formed at the electric circuit-board 23 attached to the movable piece 2. Accordingly, the field magnet signals issued from the Hall elements on the movable piece 2 as well as the encoder signal issued from the photosensor 41 arranged on the movable piece 2 are required to be transmitted only within the same circuit board on the movable piece 2 and, therefore, the transmission distance can be reduced. Consequently, an influence exerted on these signals by noises can be suppressed, which allows precise information transmission. Thereby, the movable piece 2 of the linear motor can be driven precisely, and each slider can be driven precisely so that good image reading can be performed. In the prior art, the motor drive control circuit is arranged at a fixed position outside the movable piece. In this case, the signals are transmitted through a long harness, which is routed through a long distance nearly equal to at least a length of a movable range of the movable piece, and therefore are liable to be affected by noises.

Since it is not necessary to transmit the foregoing signals externally from the movable piece 2, the cables in the harness 71 extended from the movable piece 2 can be reduced in number.

Likewise, the cables between the armature coil 21 and the motor drive control circuit 6 is not required to be extended externally from the movable piece 2. This also reduces the number of the cables in the harness 71 extended from the movable piece 2.

Since the cables in the harness 71 extended from the movable piece 2 are smaller in number than those in the prior art, this facilities routing of the harness 71 in the image reader, and improves the operation reliability of the linear motor.

Since the number of the cables in the harness 71 is reduced, the cost can also be reduced.

The connection between the armature coil 21 and the motor drive control circuit 6 is made in the same circuit-board so that the interconnection length for the same can be short. In the prior art, the connection is made by a long harness extended from the movable piece. Because each coil of the armature coil 21 has a coil resistance of several ohms, and a large current flows through the harness for energizing the armature coil, in the prior art, therefore, a current of a designed value may not flow through each coil due to the electric resistance of the harness (cables), and an intended drive power may not be produced. In the prior art, therefore, consideration must be given to the resistance value of the harness when designing the coils and others. This results in a time-consuming work. In contrast to this, the armature coil 21 and the motor drive control circuit 6 according to the invention are connected together in the same circuit-board through a short interconnection. In this structure, an interconnection resistance between them can be substantially negligible. Further, it is not necessary to route the harness transmitting a large current in the apparatus, resulting in a high reliability.

Since the lamp turn-on circuit 53 for turning on the illumination lamp LP is formed at the electric circuit-board 23 on the movable piece 2, the harness connecting them can be shorter than that in the case where the lamp turn-on circuit is arranged at the fixed position outside the movable piece. When the illumination lamp LP is a fluorescent lamp, as is done in the foregoing embodiment, the harness for connecting between the lamp turn-on circuit and the lamp may form a noise source because a large high-frequency current flows therethrough. However, the harness is short, and is not parallel with the harness 71 extended externally from the movable piece 2. Therefore, an influence by noises can be suppressed.

Electromagnetic shield means, which shields the lamp turn-on circuit 53 from the other circuits (the motor drive control circuit 6, encoder signal processing circuit 51, field magnet signal processing circuit 52 and others) on the electric circuit-board 23, may be arranged on the board 23 for suppressing an influence which may be exerted by noises generated by the lamp turn-on circuit 53 on the other circuits on the electric circuit-board 23.

The harness 71 connected to the movable piece 2 is extended in the lengthwise direction of the stator and, in other words, in the moving direction of the movable piece as shown in FIG. 5. This facilitates routing of the harness 71, and can suppress application of an excessively large force to the harness 71 and breakage thereof. Accordingly, the harness 71 can be stably used for signal transmission and others for a long term. For easy extension of the harness 71 in the moving direction of the movable piece, the connector 72 is arranged at the end, in the movable piece moving direction, of the electric circuit-board 23.

As described above, the Hall elements $h_1$, $h_2$ and $h_3$ carried by the electric circuit-board 23 can be accurately arranged at the positions satisfying the positional relationship with respect to the armature coil 21 described above by adjusting the position of the board 23 in the lengthwise direction of the stator with respect to the armature coil 23 owing to the oblong apertures 231 formed at the board 23. Therefore, these Hall elements can precisely detect the fact that the center, in the lengthwise direction of the stator, of each coil is at the position for starting the energizing, i.e., the position shifted by Pm/6 in the drive direction from the upstream end, in the drive direction, of the magnetic pole of the field magnet 11 as well as the fact that the center of the same coil is at the position for stopping the energizing, i.e., the position shifted by 2Pm/6in the drive direction from the above upstream end. If a deviation occurs in the above positional relationship, in the lengthwise direction of the stator, between each coil of the armature coil 21 and each Hall element, the current is supplied to the coil even when the coil opposes to both the N- and S-type magnetic poles. This causes a large variation in drive force, and the linear motor cannot operate precisely.

The electric circuit-board 23 is arranged vertically under the movable piece 2 and, more specifically, under the armature coil 21. Therefore, it is possible to suppress an influence exerted by a heat, which is produced from the energized armature coil 21, on electronic parts and electric circuits on the electric circuit-board 23. In this embodiment, the Hall elements are arranged radially outside the armature coil 21, and therefore are remote from the field magnet 11 compared with the case where the Hall elements are arranged radially inside the armature coil 21. In this arrangement, the Hall elements may be formed of InSb-contained Hall elements which can produce larger output signals than GaAs-contained Hall elements. Although larger output signals can be issued therefrom, the InSb-contained Hall elements have thermal characteristics inferior to those of the GaAs-contained Hall elements. However, the Hall elements are arranged at positions which can suppress an influence by the heat of the armature coil 21 so that the polarities of the magnetic poles can be detected precisely by the Hall elements.

Figure 16:
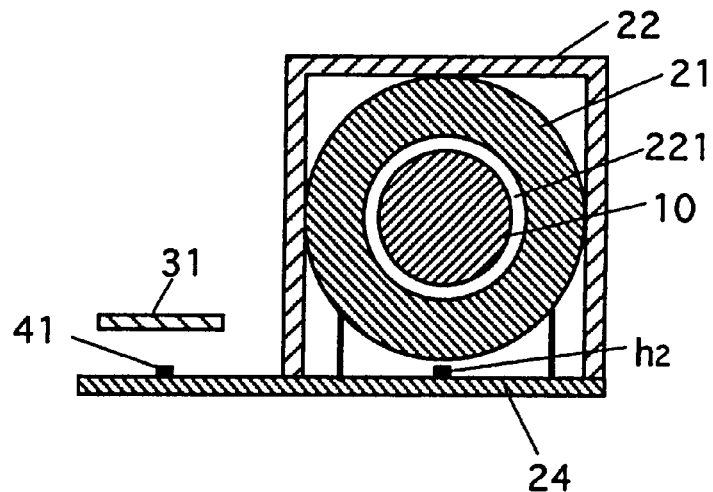
FIG. 16 is a schematic cross section of another example of a linear motor according to the invention.

Since the electric circuit-board 23 is a so-called double-sided board, the Hall elements $h_1$, $h_2$ and $h_3$ can be arranged on the front surface of the board 23, and the photosensor 41 can be arranged on the rear surface thereof. Therefore, the board 23 can be compact so that the whole movable piece 2 can be compact. The electric circuit-board 23 may be formed of a single-side board. The single-sided board can reduce a cost of the board 23 itself. In the structure employing the single-sided board 23 as shown in FIG. 16, the Hall elements and the photosensor are arranged on the single surface of the board. The Hall elements on the electric circuit-board 24 in FIG. 16 are arranged at positions similar to those shown in FIG. 5, and the photosensor 41 is arranged on the same surface of the board 23 as that carrying the Hall elements. Even in this case, the encoder scale 31 is parallel to the stator 1, and is opposed to the photosensor 41.

According to the linear motors LMa and LMb of the invention, as described above, it is possible to suppress an influence which may be exerted by noises on the output signals of the photosensor 41 for the encoder and the Hall elements $h_1$, $h_2$ and $h_3$ for the field magnet arranged on the movable piece 2 for controlling the power supply to the armature coil 21. Therefore, the motor drive control circuit 6 can receive precise field magnet information and encoder information. Thereby, the movable piece 2 can be driven precisely. Accordingly, in the image reader of the invention which utilizes the linear motors LMa and LMb for driving the sliders SL1 and SL2, an influence by noises can be suppressed, and the sliders can be drive precisely so that the image reading operation can be improved.

Although the optical encoder employed in the embodiment is of the reflective type, it may be of a transparent type. Also, a magnetic encoder may be employed instead of the optical encoder. In the magnetic encoder, the encoder scale is provided with N- and S-type magnetic poles arranged alternately in the lengthwise direction of the stator, and a magnetoelectric conversion element such as a magnetic resistance element (MR element) may be employed instead of the photosensor. An example of a circuit for digitizing the output signal of the magnetic resistance element is shown in FIG. 17.

Figure 17:
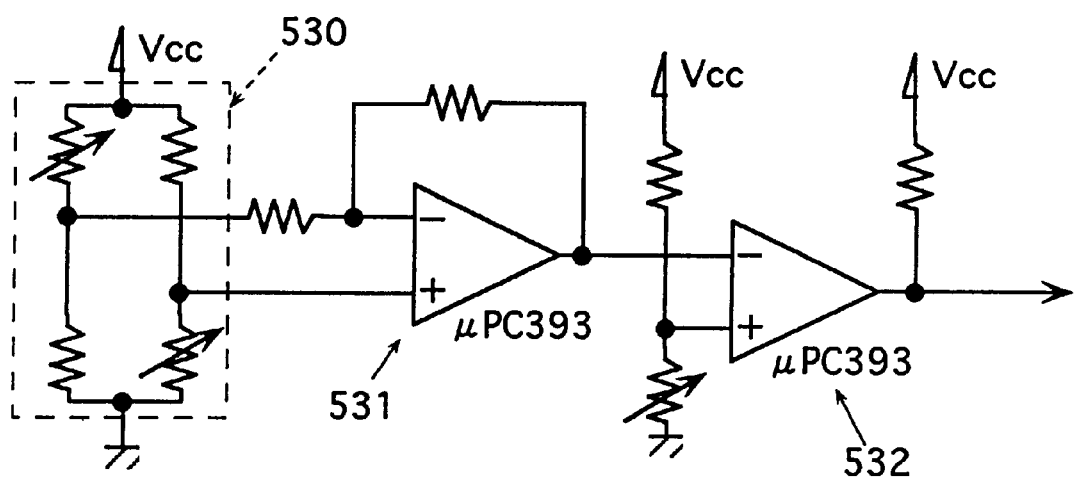
FIG. 17 shows another example of an encoder signal processing circuit.

An MR element 530 shown in FIG. 17 issues two signals of different phases shifted by 180 degrees from each other. These two signals are differentially amplified by a differential amplifier 531, and are converted by a comparator 532 into digital signals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor provided with a stator extending in a predetermined direction and a movable piece being movable along said stator, and comprising:

a field magnet arranged at said stator;

an armature coil arranged at said movable piece and opposed to said field magnet; and a drive circuit for energizing said armature coil and thereby driving said movable piece, wherein said drive circuit is formed at an electric circuit-board arranged on said movable piece.

2. The linear motor according to claim 1, wherein said armature coil is formed of two or more single-coils, each of said single-coils is electrically connected to said electric circuit-board, and said electric circuit-board forms a predetermined electric connection among said single-coils.

3. The linear motor according to claim 1, further comprising:

an magnetoelectric conversion element for the field magnet arranged on said movable piece and opposed to said field magnet; and a field magnet signal processing circuit for digitizing an electric signal issued from said magnetoelectric conversion element for the field magnet, wherein said field magnet signal processing circuit is arranged at said electric circuit-board.

4. The linear motor according to claim 3, wherein a Hall IC is employed as said magnetoelectric conversion element for the field magnet and said field magnet signal processing circuit.

5. The linear motor according to claim 3, wherein said magnetoelectric conversion element for the field magnet is arranged at said electric circuit-board.

6. The linear motor according to claim 5, wherein the position of said electric circuit-board arranged on said movable piece is adjustable, in the lengthwise direction of said stator, with respect to said armature coil.

7. The linear motor according to claim 1, further comprising:

an encoder scale extending in the lengthwise direction of said stator and arranged at a fixed position;

an encoder sensor arranged on said movable piece and opposed to said encoder scale; and an encoder signal processing circuit for digitizing an output signal of said encoder sensor, wherein said encoder signal processing circuit is arranged on said electric circuit-board.

8. The linear motor according to claim 7, wherein said encoder sensor is carried by said electric circuit-board.

9. The linear motor according to claim 1, wherein an input/output harness for said electric circuit-board is extended in the lengthwise direction of said stator from an end, in the lengthwise direction of said stator, of said electric circuit-board.

10. An image reader for optically scanning and reading an original image, comprising:
- a slider carrying optical parts including an illumination lamp for optically scanning the original image and being driven linearly in a predetermined direction;
- a lamp turn-on circuit for turning on said illumination lamp;
- a stator provided with a field magnet having N- and S-type magnetic poles arranged alternately and linearly in said predetermined direction;
- a movable piece having an armature coil opposed to said field magnet, being movable along said stator, and coupled to said slider; and
- a drive circuit for energizing said armature coil and thereby driving said movable piece, wherein
- said lamp turn-on circuit and said drive circuit are formed at an electric circuit-board arranged on said movable piece.

11. The image reader according to claim 10, wherein
said armature coil is formed of two or more single-coils, each of said single-coils is electrically connected to said electric circuit-board, and said electric circuit-board forms a predetermined electric connection among said single-coils.

12. The image reader according to claim 10, further comprising:
- an magnetoelectric conversion element for the field magnet arranged on said movable piece and opposed to said field magnet; and
- a field magnet signal processing circuit for digitizing an electric signal issued from said magnetoelectric conversion element for the field magnet, wherein
- said field magnet signal processing circuit is arranged at said electric circuit-board.

13. The image reader according to claim 12, wherein
a Hall IC is employed as said magnetoelectric conversion element for the field magnet and said field magnet signal processing circuit.

14. The image reader according to claim 12, wherein
said magnetoelectric conversion element for the field magnet is arranged at said electric circuit-board.

15. The image reader according to claim 14, wherein
the position of said electric circuit-board arranged on said movable piece is adjustable, in the lengthwise direction of said stator, with respect to said armature coil.

16. The image reader according to claim 10, further comprising:
- an encoder scale extending in the lengthwise direction of said stator and arranged at a fixed position;
- an encoder sensor arranged on said movable piece and opposed to said encoder scale; and
- an encoder signal processing circuit for processing an output signal of said encoder sensor, wherein
- said encoder signal processing circuit is arranged on said electric circuit-board.

17. The image reader according to claim 16, wherein
said encoder sensor is carried by said electric circuit-board.

18. The image reader according to claim 10, wherein
an input/output harness for said electric circuit-board is extended in the lengthwise direction of said stator from an end, in the lengthwise direction of said stator, of said electric circuit-board.

19. An image reader for optically scanning and reading an original image, comprising:
- a slider carrying an illumination light source for emitting light to the original image and being driven linearly in a predetermined direction;
- a stator provided with a field magnet having N- and S-type magnetic poles arranged alternately and linearly in said predetermined direction;
- a movable piece having an armature coil opposed to said field magnet, being movable along said stator, and coupled to said slider; and
- a drive circuit for energizing said armature coil and thereby driving said movable piece, wherein
- said drive circuit is formed at an electric circuit-board arranged on said movable piece.

* * * * *